United States Patent
Yuan et al.

(10) Patent No.: US 9,033,614 B2
(45) Date of Patent: May 19, 2015

(54) PIPE COMPONENTS AND METHODS OF MANUFACTURE

(71) Applicant: Wellstream International Limited, Newcastle-upon-Tyne (GB)

(72) Inventors: Jiabei Yuan, Houston, TX (US); Zhimin Tan, Katy, TX (US); Yucheng Hou, Katy, TX (US); Yanqiu Zhang, Houston, TX (US)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 64 days.

(21) Appl. No.: 13/905,001

(22) Filed: May 29, 2013

(65) Prior Publication Data

US 2014/0356073 A1 Dec. 4, 2014

(51) Int. Cl.
*F16L 1/24* (2006.01)

(52) U.S. Cl.
CPC ........................................ *F16L 1/24* (2013.01)

(58) Field of Classification Search
USPC .................. 405/169, 171, 211, 224.2–224.4; 114/243; 166/350
See application file for complete search history.

(56) References Cited

U.S. PATENT DOCUMENTS

| | | | | |
|---|---|---|---|---|
| 4,171,674 A | * | 10/1979 | Hale | 114/243 |
| 4,422,801 A | * | 12/1983 | Hale et al. | 405/171 |
| 4,474,129 A | * | 10/1984 | Watkins et al. | 114/243 |
| 6,644,894 B2 | * | 11/2003 | Shu et al. | 405/211 |
| 2010/0307762 A1 | * | 12/2010 | Howard et al. | 166/350 |
| 2011/0280667 A1 | * | 11/2011 | Branchut et al. | 405/224.2 |
| 2011/0299927 A1 | * | 12/2011 | McCormick et al. | 405/27 |

FOREIGN PATENT DOCUMENTS

| WO | WO 2007/125276 | 11/2007 |
|---|---|---|
| WO | WO 2009/150443 | 12/2009 |

* cited by examiner

*Primary Examiner* — Tara M. Pinnock
(74) *Attorney, Agent, or Firm* — Klarquist Sparkman, LLP

(57) ABSTRACT

A connector assembly, riser assembly and method of producing a connector assembly are disclosed. The connector assembly includes a body portion for locating over a flexible pipe and arranged to be connectable to or formed integrally with one or more buoyancy compensating element, and one or more protrusion extending from the body portion and arranged to reduce or interrupt vortex induced vibrations in water surrounding the flexible pipe in use.

17 Claims, 9 Drawing Sheets

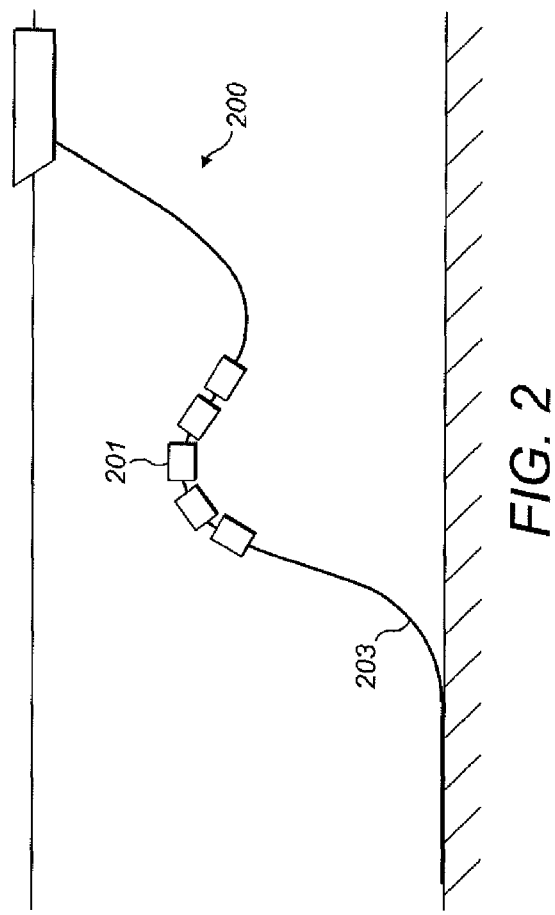
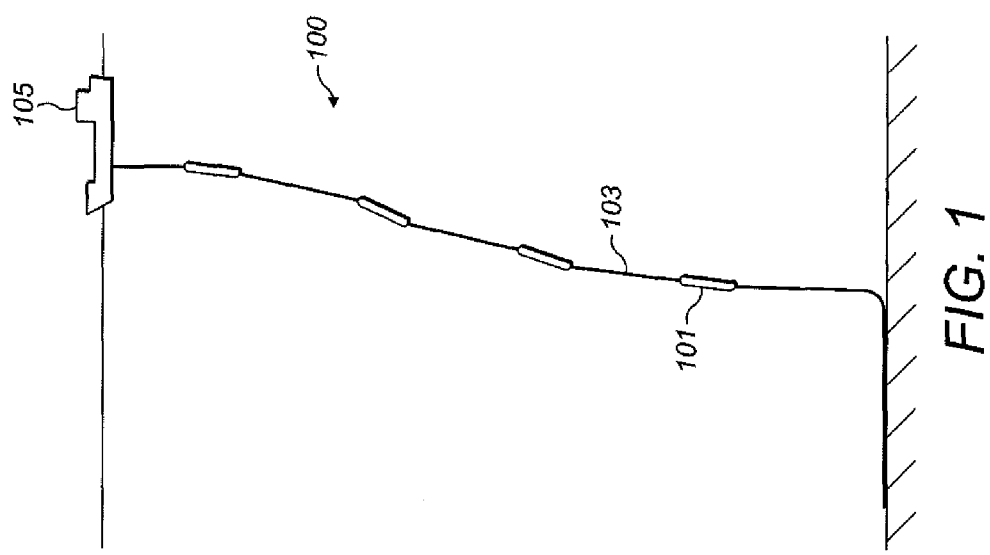
FIG. 2
FIG. 1

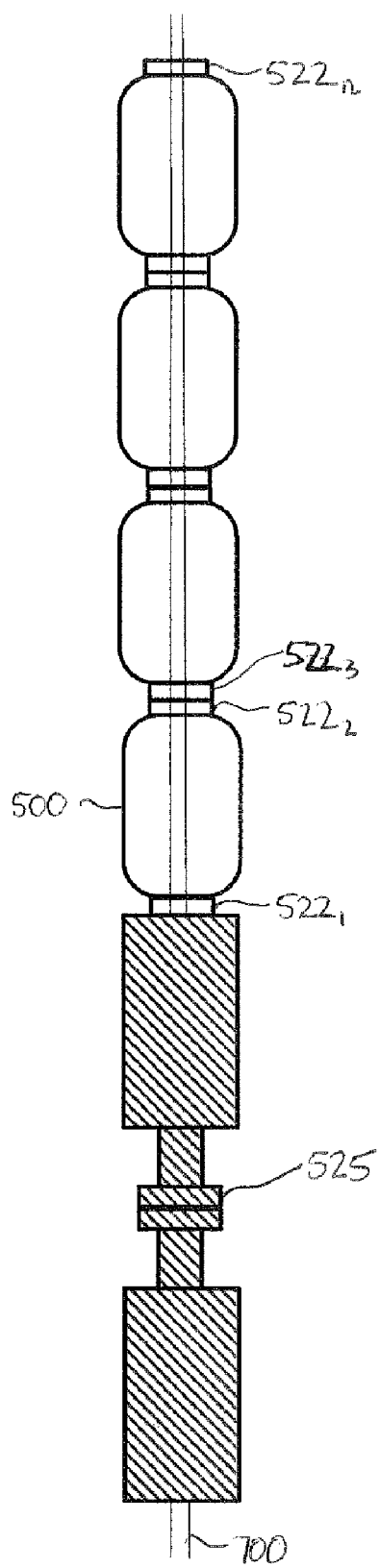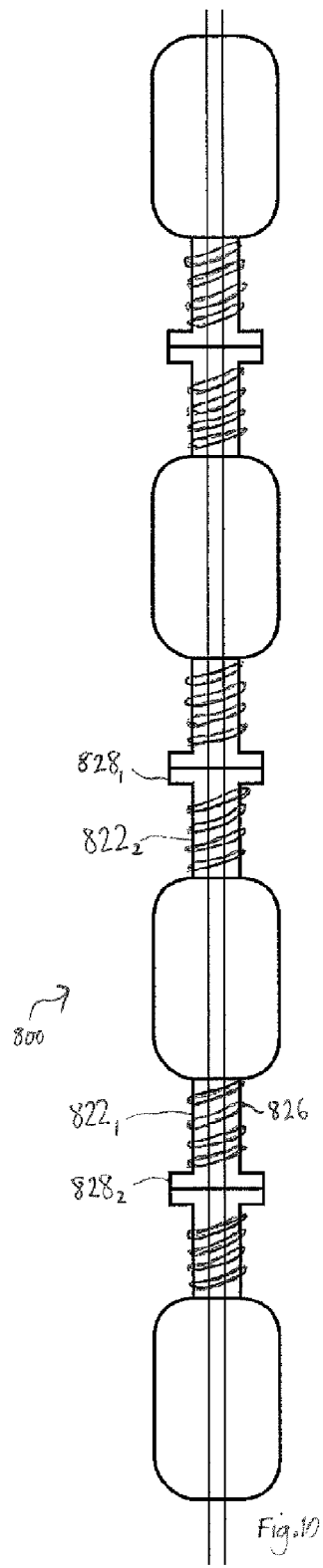
Fig. 7
Fig. 10

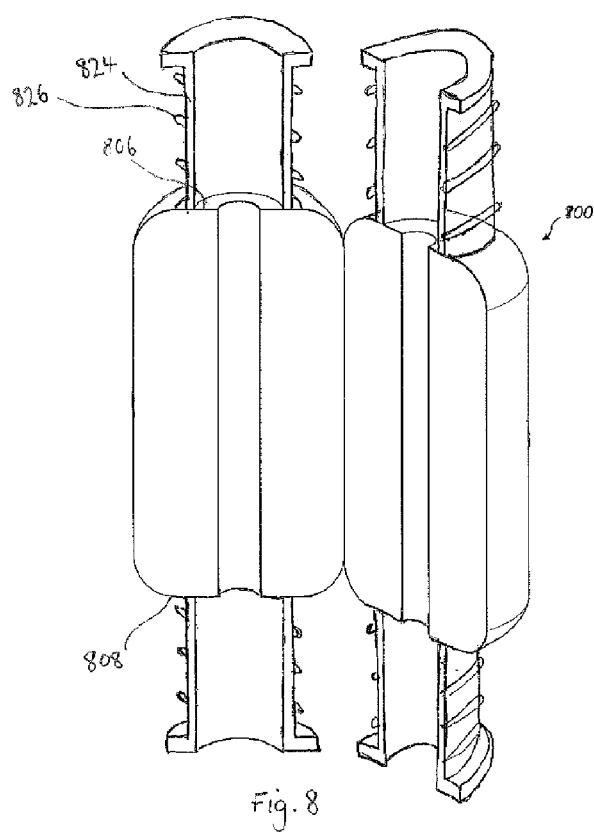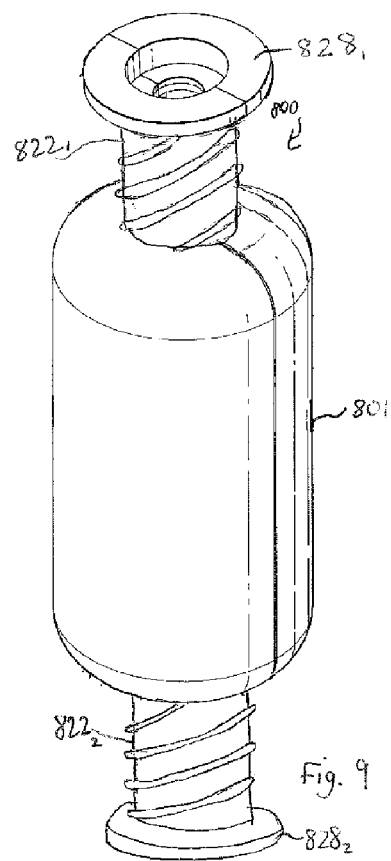

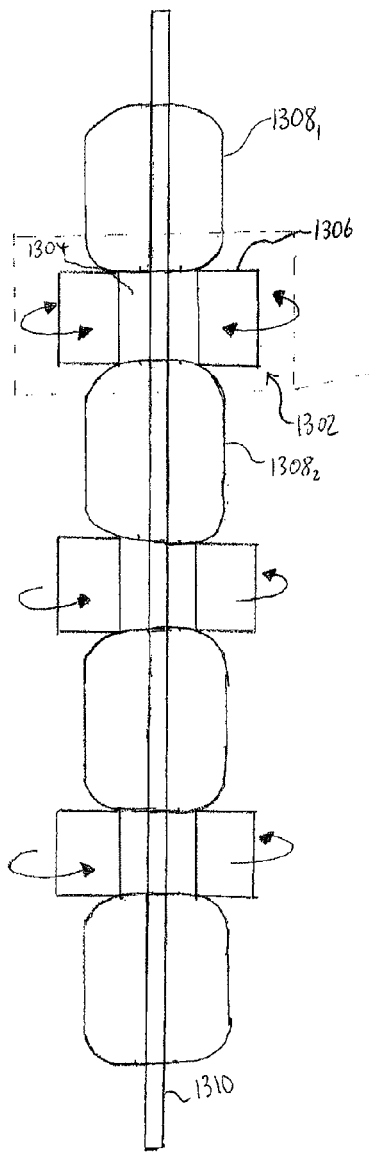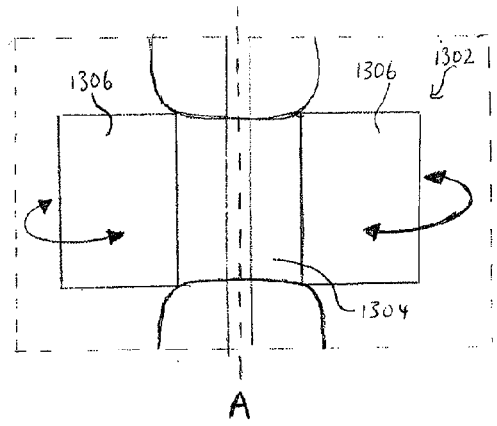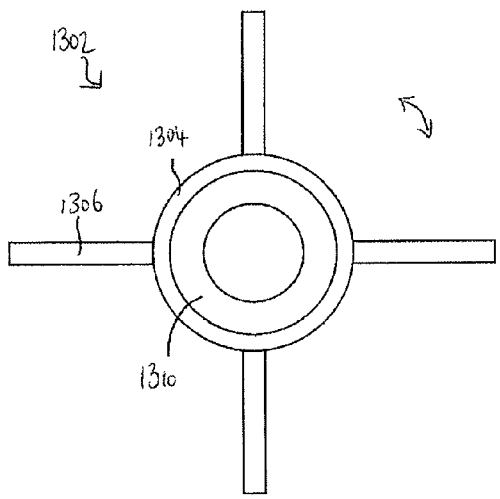
FIG. 14A
FIG. 14
FIG. 13

PIPE COMPONENTS AND METHODS OF MANUFACTURE

FIELD

The present invention relates to components for flexible pipes and methods of manufacturing components. In particular, but not exclusively, the present invention relates to components that may be coupled to a flexible pipe and connected to a buoyancy compensating element or between two buoyancy compensating elements.

BACKGROUND

Traditionally flexible pipe is utilized to transport production fluids, such as oil and/or gas and/or water, from one location to another. Flexible pipe is particularly useful in connecting a sub-sea location (which may be deep underwater, say 1000 meters or more, or shallower water, say 250 meters to 1000 meters) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body often generally includes metallic and polymer layers.

In many known flexible pipe designs the pipe body includes one or more tensile armour layers. The primary loading on such a layer is tension. In high pressure applications, such as in deep and ultra deep water environments (deep water being considered as less than 3,500 feet (1,005.84 meters) and ultra deep water as greater than 3,500 feet), the tensile armour layer experiences high tension loads from a combination of the internal pressure end cap load and the self-supported weight of the flexible pipe. This can cause failure in the flexible pipe since such conditions are experienced over prolonged periods of time.

One technique which has been attempted in the past to in some way alleviate the above-mentioned problem is the addition of buoyancy aids at predetermined locations along the length of a riser. The buoyancy aids provide an upwards lift to counteract the weight of the riser, effectively taking a portion of the weight of the riser, at various points along its length. Employment of buoyancy aids involves a relatively lower installation cost compared to some other configurations, such as a mid-water arch structure, and also allows a relatively faster installation time.

An example of a known riser configuration using buoyancy aids to support the riser is a stepped riser configuration 100, such as disclosed in WO2007/125276 and shown in FIG. 1, in which buoyancy aids 101 are provided at discrete locations along a flexible pipe 103. Alternatively the buoyancy aids can be provided in groups (i.e. 2 or more buoyancy aids) at discrete locations along a flexible pipe. The riser is suitable for transporting production fluid, e.g. oil and/or gas and/or water from a subsea location to a floating facility 105 such as a platform or buoy or ship. A further example of a known riser configuration using buoyancy aids is a lazy wave configuration 200 shown in FIG. 2, in which buoyancy aids 201 are provided at points (positions) along a flexible pipe 203 so as to provide a 'hog bend' in the riser. The lazy wave configuration is often preferred for shallow water applications. In such applications there are often significant dynamic motions in the flexible pipe as a result of vessel or platform movement, currents and sea states. These can lead to large stress variations in layers of the pipe body and rapidly accumulate fatigue damage as a result. This can be exacerbated by the presence of buoyancy which increases the incident cross section of the flexible pipe configuration on which the currents will act.

WO2007/125276 discloses a flexible pipe including rigid buoyancy supports at one or more points along a riser assembly. The rigid buoyancy support provides a rigid surface to affix buoyancy aids to the flexible pipe, thereby avoiding crushing of the flexible pipe due to compression loads being exerted as the buoyancy aid is attached.

Other riser configurations may require the addition of ballast weight to a flexible pipe to decrease the buoyancy of the pipe at one or more positions to suit a particular marine environment or production fluid extraction set up.

A problem that is experienced with flexible pipes, in particular when used in a riser configuration, is that water flowing past the pipe causes vortex shedding. Vortices are created on the downstream side of the pipe, which are shed from alternate sides and can give rise to pressure variations and result in excessive motions of the pipe. The term vortex induced vibration (VIV) has been coined in the art to describe the phenomenon which results in such problems.

The current flows, if strong enough and sufficiently uniform or consistent, can result in vortex shedding which can excite the natural resonant/oscillatory frequency of the pipeline. The kinetic energy delivered to the pipeline can in these circumstances be significant enough to cause fatigue failure of the pipe or damage to surrounding or connecting structures as some of the motion and energy is transmitted to them from the vibrating pipe.

Buoyancy sections of a riser can be subject to these vortex shedding forces. For a buoyancy aid in use underwater, which may have a cylindrical shape, water flow passing around the buoyancy aid can form a boundary layer. Resultant vortices change the pressure distribution along the surface of the buoyancy aid and resultant net forces may cause the buoyancy aid to move transversely. If the frequency of VIV is close to the resonant frequency of the pipeline in its installed configuration, including the buoyancy aid, the riser will experience larger oscillations of movement and this may lead to failure of the riser system.

As used herein, the term "buoyancy compensating element" is used to encompass both buoyancy aids for increasing buoyancy and ballast weights for decreasing buoyancy.

SUMMARY

According to a first aspect of the present disclosure there is provided a connector assembly for connection between buoyancy compensating elements on a flexible pipe, comprising: a body portion for locating over a flexible pipe and arranged to be connectable to or formed integrally with one or more buoyancy compensating element, and one or more protrusion extending from the body portion and arranged to reduce or interrupt vortex induced vibrations in water surrounding the flexible pipe in use.

According to a second aspect of the present disclosure there is provided a riser assembly comprising a flexible pipe, a connector assembly as described in the first aspect and a buoyancy compensating element connected to or integral with the connector assembly.

According to a third aspect of the present disclosure there is provided a method of manufacturing a connector assembly for connection between buoyancy compensating elements on a flexible pipe, comprising: providing a body portion for locating over a flexible pipe, the body portion arranged to be connectable to or formed integrally with one or more buoyancy compensating element, and forming one or more protrusion extending from the body portion, the one or more protrusion arranged to reduce or interrupt vortex induced vibrations in water surrounding the flexible pipe in use.

Certain embodiments of the disclosure provide the advantage that forces exerted on a flexible pipe or riser arrangement from VIV may be reduced compared to known configurations. Certain embodiments provide the advantage that vortex-generated oscillation may be suppressed at the buoyancy section of a flexible pipe or riser assembly.

Certain embodiments of the disclosure enable a connector assembly, flexible pipe, and/or riser assembly that may be produced and installed in a cost effective manner.

Certain embodiments of the disclosure provide the advantage that the lifetime of a flexible pipe, or riser, may be prolonged.

The foregoing and other features and advantages of the invention will become more apparent from the following detailed description, which proceeds with reference to the accompanying figures.

BRIEF DESCRIPTION OF THE DRAWINGS

Embodiments of the invention are further described hereinafter with reference to the accompanying drawings, in which:

FIG. 1 illustrates a known riser configuration.
FIG. 2 illustrates another known riser configuration.
FIG. 7 illustrates a buoyancy arrangement with buoyancy aids on a flexible pipe.
FIG. 8 illustrates a buoyancy aid and connectors in an open configuration.
FIG. 9 illustrates an buoyancy aid and connectors in a closed configuration.
FIG. 10 illustrates buoyancy aid arrangements connected to a flexible pipe.
FIG. 13 illustrates a plan view of a connector.
FIG. 14 illustrates buoyancy aid arrangements connected to a flexible pipe.
FIG. 14A is an enlarged view of a section of FIG. 14.

In the drawings like reference numerals refer to like parts.

DETAILED DESCRIPTION

Figure 3:
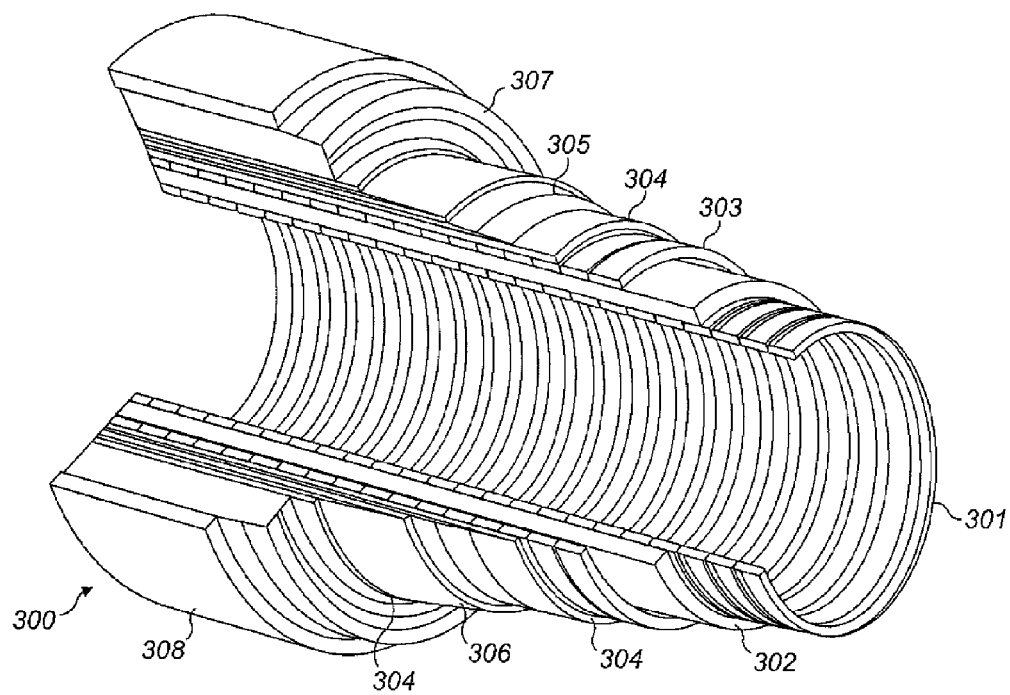
FIG. 3 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 3 illustrates how pipe body 300 is formed in accordance with an embodiment of the present invention from a combination of layered materials that form a pressure-containing conduit. Although a number of particular layers are illustrated in FIG. 3, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 3, a pipe body includes an optional innermost carcass layer 301. The carcass provides an interlocked construction that can be used as the innermost layer to prevent, totally or partially, collapse of an internal pressure sheath 302 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 302 acts as a fluid retaining layer and comprises a polymer layer that ensures internal fluid integrity. It is to be understood that this layer may itself comprise a number of sub-layers. It will be appreciated that when the optional carcass layer is utilized the internal pressure sheath is often referred to by those skilled in the art as a barrier layer. In operation without such a carcass (so-called smooth bore operation) the internal pressure sheath may be referred to as a liner.

An optional pressure armour layer 303 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 305 and optional second tensile armour layer 306. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 304 which help contain underlying layers and to some extent prevent abrasion between adjacent layers.

The flexible pipe body also typically includes optional layers of insulation 307 and an outer sheath 308, which comprises a polymer layer used to protect the pipe against penetration of seawater and other external environments, corrosion, abrasion and mechanical damage.

Each flexible pipe may comprise at least one portion, sometimes referred to as a segment or section of pipe body 300 together with an end fitting located at at least one end of the flexible pipe. An end fitting provides a mechanical device which forms the transition between the flexible pipe body and a connector. The different pipe layers as shown, for example, in FIG. 3 are terminated in the end fitting in such a way as to transfer the load between the flexible pipe and the connector.

Alternatively, a segment of flexible pipe body may be jointed to a further segment of pipe body by other types of midline connection, such as described in WO2009/150443. A midline connection is considered to be any connection between flexible pipe body segments that in use lies between the vessel or platform and seabed.

Figure 4:
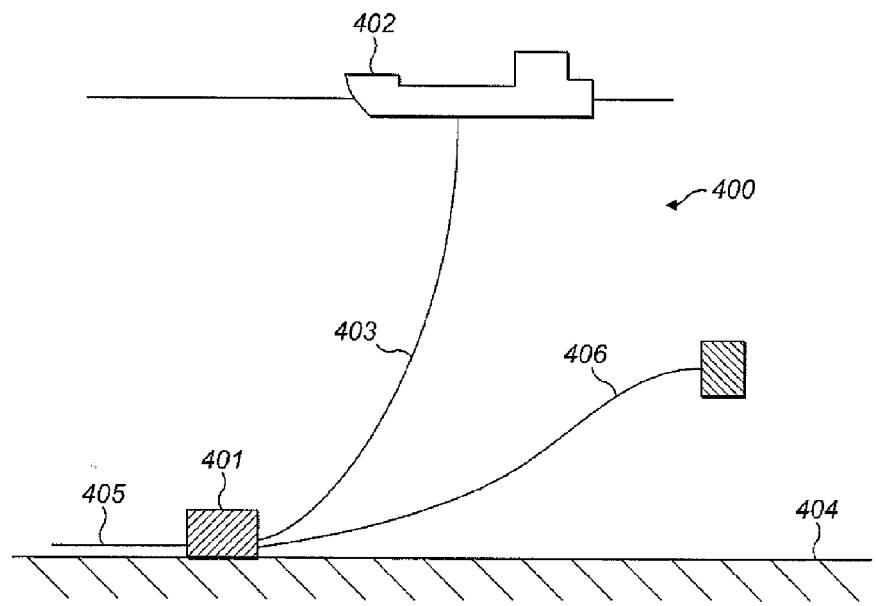
FIG. 4 illustrates a riser configuration.

FIG. 4 illustrates a riser assembly 400 suitable for transporting production fluid such as oil and/or gas and/or water from a sub-sea location 401 to a floating facility 402. For example, in FIG. 4 the sub-sea location 401 includes a sub-sea flow line. The flexible flow line 405 comprises a flexible pipe, wholly or in part, resting on the sea floor 404 or buried below the sea floor and used in a static application. The floating facility may be provided by a platform and/or buoy or, as illustrated in FIG. 4, a ship. The riser assembly 400 is provided as a flexible riser, that is to say a flexible pipe 403 connecting the ship to the sea floor installation. The flexible pipe may be in segments of flexible pipe body with connecting end fittings, as discussed above.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes). FIG. 4 also illustrates how portions of flexible pipe can be utilized as a flow line 405 or jumper 406. A riser assembly according to the invention may be arranged as shown in FIG. 4, or as shown in FIG. 1 or FIG. 2, for example.

Figure 6:
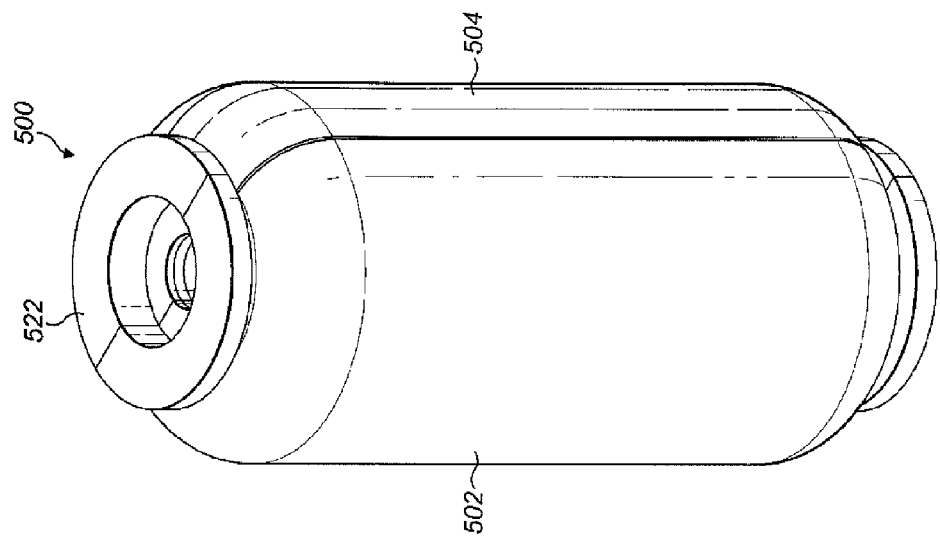
FIG. 6 illustrates a buoyancy aid in a closed configuration.
Figure 5:
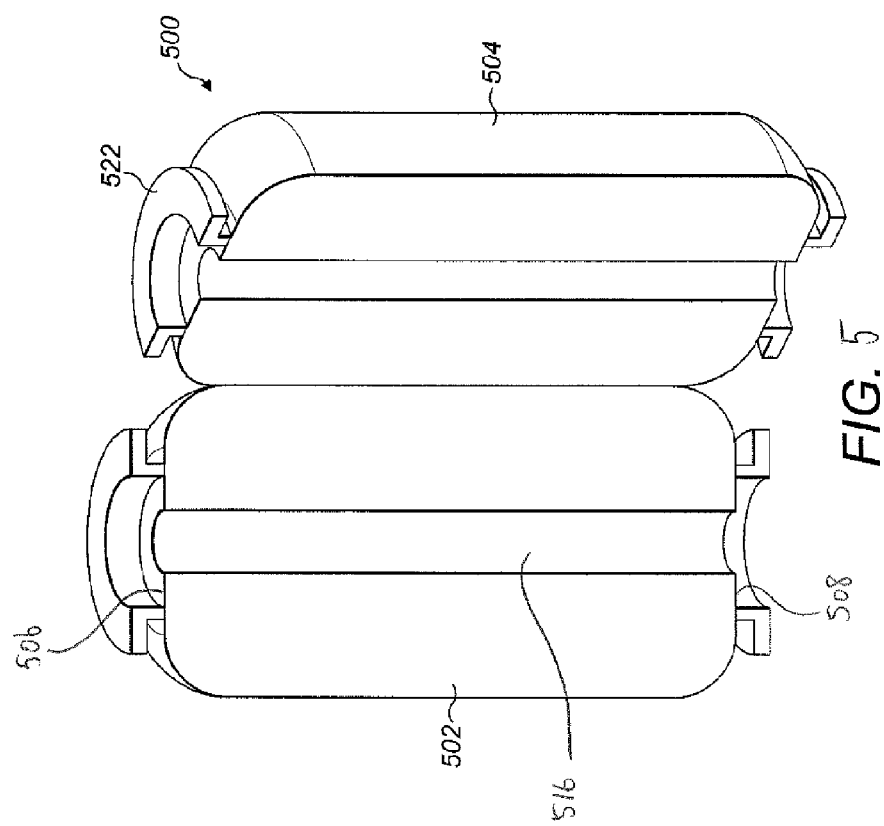
FIG. 5 illustrates a buoyancy aid in an open configuration.

FIGS. 5 and 6 show an example of a buoyancy compensating element (buoyancy aid) 500. The buoyancy aid 500 includes a first body portion 502 and a further body portion 504. The body portions are connectable to each other to form the buoyancy aid. In the example shown, the buoyancy aid is split into two substantially identical body portions. The body portions 502,504 are configured to be connectable to each other. The body portions may be joined by bolts (not shown) to secure the portions to each other. The bolts are inserted into appropriately sized hollowed cavities and tightened. Alternatively it will be appreciated that many other forms of configuration could be used to connect the body portions, e.g. straps or other windings around the joined portions, or forms of adhesive or weldment, for example.

A cutaway portion 516 of each body portion is configured (sized and shaped) such that when the body portions are connected, the body portions will envelop a flexible pipe. Since the cutaway portions are semi-cylindrical, they will form a cylindrical channel to receive a flexible pipe.

The buoyancy aid 500 in this example includes a protective shell to cover the outer surfaces of the body portions. The shell may be formed from steel, composite or any other material that will give a degree of protection to the buoyancy aid from seawater. The inner portion of the body portions are syntactic foam in this example. The body portions also have a radially inner layer along the semi-cylindrical cutaway portion (made from steel in this example). This radially inner layer is provided to form a friction-resistant interface between the syntactic foam body and a flexible pipe.

The buoyancy aid 500 also includes connectors 522 for connecting the buoyancy aid to further components. In FIGS. 5 and 6 the connector 522 is in the shape of a flange protruding from first and/or second end surfaces 506,508, which can be connected to the flange of a further buoyancy aid or a part of a flexible pipe, for example. The connectors may be any suitable configuration, for example in the shape of a flange protruding from the first and/or second end surfaces 506,508 with appropriate means (not shown, but for example bolts or clamp connector units known in the art) to connect the flange to the further component, which could be a further buoyancy element or a part of the flexible pipe.

In a stepped riser configuration, for example, a buoyancy section including a number of connected buoyancy aids attached to a flexible pipe may be used, as shown in the cross section of FIG. 7. Each buoyancy element 500 is connected to one or more adjacent buoyancy element via a connector $522_{1-n}$. A first buoyancy aid is secured to the flexible pipe via a midline connection, and further buoyancy aids are secured in sequence to the first buoyancy aid. As such, any forces from the later-added buoyancy aids are transmitted through earlier-added buoyancy aids to the midline connection.

For example, a connector $522_1$ is arranged to connect with a midline connection 525 of the flexible pipe 700. Here the midline connection is a pair of end fittings joined in a back-to-back configuration. The connector $522_1$ securely clamps on to the midline connection to form a firm join between the two components. The means of forming a connection may be any kind of mechanical fitting (screw type, male/female type, etc.), bolts or other means. Since the buoyancy aid 500 is clamped to the midline connection, which is a rigid structure, excessive crushing loads are not applied to the flexible pipe body. A connector $522_2$ may be positioned against a further connector $522_3$ in a back-to back configuration and the connectors fixed together with bolts, for example.

It is also possible to use centralisers inside the formed assembly so as to maintain the relative positions of the buoyancy aids against the pipe. Centralisers are known in the art and may be positioned at predetermined intervals along a pipe.

FIGS. 8 and 9 show a buoyancy aid arrangement 800 including a buoyancy aid portion 801 and connectors $822_1$, $822_2$ according to an embodiment of the present invention. The arrangement 800 is similar to the buoyancy aid 500 shown in FIGS. 5 and 6. However, the connectors $822_1,822_2$ at a first end 806 and further end 808 of the buoyancy aid are modified compared to those shown in FIGS. 5 and 6. A connector 822 includes a body portion 824 and a protrusion 826, in this case a strake, extending from the body portion 824. The connector 822 is connected to an end face 806/808 of the buoyancy aid by welding during the manufacturing process.

The strake 826 is a single protrusion or projection that extends from the body portion 824 substantially radially and winds helically around the body portion from a first end to a further end of the body portion. In this embodiment the protrusion extends about 1 cm outwards from the body portion in a radial direction, though the protrusion(s) could extend any geometrically allowable distance, e.g. 2 cm, 5 cm, 10 cm, 20 cm. Alternatively there may be provided a plurality of strakes that wind helically around the body portion. Here the strake has a cross section that is approximately semi-circular, generally rounded. The helical angle of the strake from the longitudinal axis of the pipe will be selected to provide maximum benefit, and may be 10 degrees, or 30 degrees, or 45 degrees, or 60 degrees, or 80 degrees.

Each connector 822 also includes a flange $828_1,828_2$ at an end of the connector distal from the buoyancy aid portion 801. The flange 828 is an engaging element, so that the flange may be mated with a further flange of an adjacent buoyancy aid arrangement by bolts or other fixing mechanism, for example a clamp. In this way two or more buoyancy aids may be connected in series in an in-line configuration, encompassing a flexible pipe, as shown in FIG. 10. FIG. 10 is generally a perspective view, though for illustrative purposes the full length of the flexible pipe is shown. As per FIG. 7, a first connector of a first buoyancy aid arrangement is arranged to connect with a midline connection of a flexible pipe. The first connector clamps on to the midline connection. Then a further connector of a further buoyancy aid arrangement may be positioned against the first connector in a back-to back configuration, and the connectors fixed together with bolts, for example. Further buoyancy aid arrangements may be added as required in a similar manner.

In this embodiment the buoyancy aid portion 801 (not including the connectors) has a length of around 1.5 m, diameter 0.75 m, and each connector 822 has a length of around 0.25 m, diameter around 0.4 m (with a flange having a diameter of around 0.6 m). Of course these dimensions may be varied to suit the particular environment of use, length of flexible pipe, etc. Alternatively the strakes may be applied to the clamps connecting two connector elements $822_n$ and $822_{n+1}$, the clamps themselves having a similar outside diameter as the buoyancy aid portion 801, and so that the strakes protrude beyond the outer diameter of the buoyancy aid portion 801.

The connector 822 is in this case formed entirely from metal, carbon steel. Of course other materials may be used to form the connector, e.g. stainless steel, other metals, composites, polymers, a mixture thereof, etc. The flange may be formed from another material to the body portion.

Figures 11, 11A:
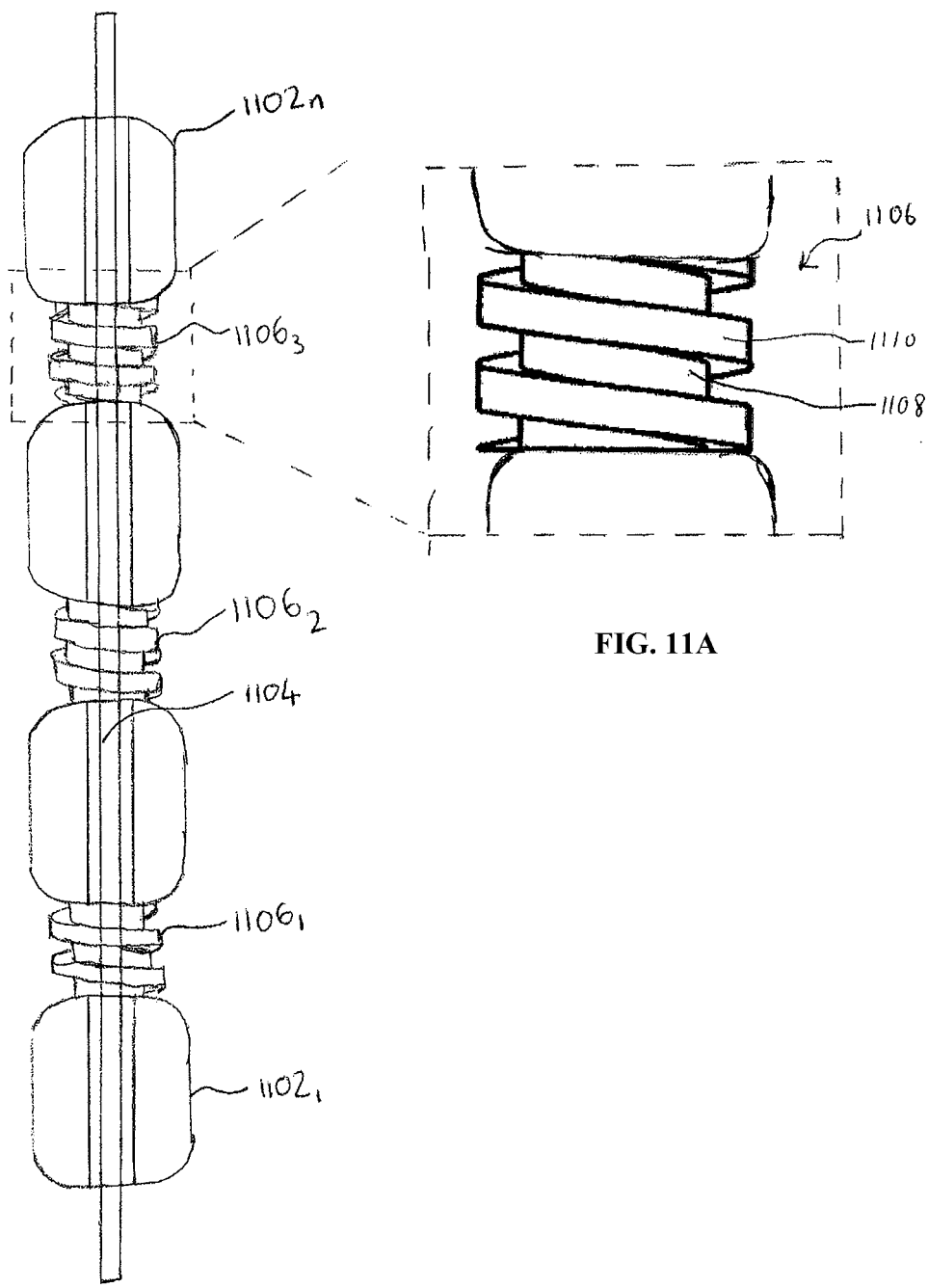
FIG. 11 illustrates buoyancy aid arrangements connected to a flexible pipe.
FIG. 11A is an enlarged view of a section of FIG. 11.

FIG. 11 shows another embodiment of the invention in which buoyancy aids $1102_{1-n}$ are attached to a flexible pipe 1104. In this embodiment connectors $1106_{1-n}$ are initially provided as separate elements to the buoyancy aids $1102_{1-n}$, and are added to the flexible pipe 1104 as the pipe is payed out into the water from a floating platform or ship for example. The connectors are alternated with the buoyancy aids, e.g. a first buoyancy aid is added, and then a connector, and then a buoyancy aid, etc. FIG. 11 is generally a perspective view, though for illustrative purposes the full length of the flexible pipe is shown.

The connectors $1106_{1-n}$ in this embodiment are each a discrete element. Therefore, between two buoyancy aids, rather than two connectors that are each associated with a respective buoyancy aid being mated together (as described above with respect to FIGS. 9 and 10), a single connector is provided.

A connector 1106 is formed from a body portion 1108 in this embodiment. The body portion 1108 is itself formed from two hinged and/or bolted portions that are moveable so as to clamp over a portion of flexible pipe. In other embodiments the connector may be formed as a single piece or in 3 or more portions that are connectable to each other to form a connector (similarly to the connectors shown in FIG. 8). The connector 1106 includes a body portion 1108 and a protrusion (strake) 1110 extending from the body portion 1108. The connector is in this case formed from polyurethane.

The body portion 1108 is (in its in-use position) a hollow, generally cylindrical tube shape, with dimensions to allow the connector to be clamped over, i.e. concentric with, a portion of flexible pipe. Here each connector 1106 has a length of around 0.3 m, diameter around 0.5 m. Of course these dimensions may be varied to suit the particular environment of use, length of flexible pipe, etc.

The body portion is configured to be connectable with an adjacent buoyancy aid. Although not shown in the drawings, the body portion is configured with an engagement means (an engaging element), e.g. any kind of mechanical fitting (screw type, male/female type, etc.), bolts or other means. The engagement means allows the connector to be connected to an adjacent buoyancy aid. The buoyancy aid may be configured accordingly so as to be mated with a connector. For example, a connector and a buoyancy aid may each respectively have protrusions and/or cavities to mate with a corresponding protrusion/cavity.

In this case the connector is configured to be clamped to a flexible pipe, whilst the adjacent buoyancy aids are connected to the connector (so not connected to the flexible pipe themselves). Of course in other arrangements the buoyancy aids may be clamped to the flexible pipe, and the connectors may not be clamped but may have a degree of movement with respect to the pipe. Other combinations are also possible to suitably arrange buoyancy aids and connectors on a flexible pipe.

The strake 1110 forms a square screw thread surface on the connector 1106. The strake is a protrusion that extends from the body portion substantially radially and winds helically around the body portion from a first end to a further end of the body portion. In this embodiment the protrusion extends about 2 cm from the body portion in a radial direction, though the protrusion(s) could extend any suitable, geometrically permissible distance determined to provide maximum beneficial effect.

Figures 12, 12A:
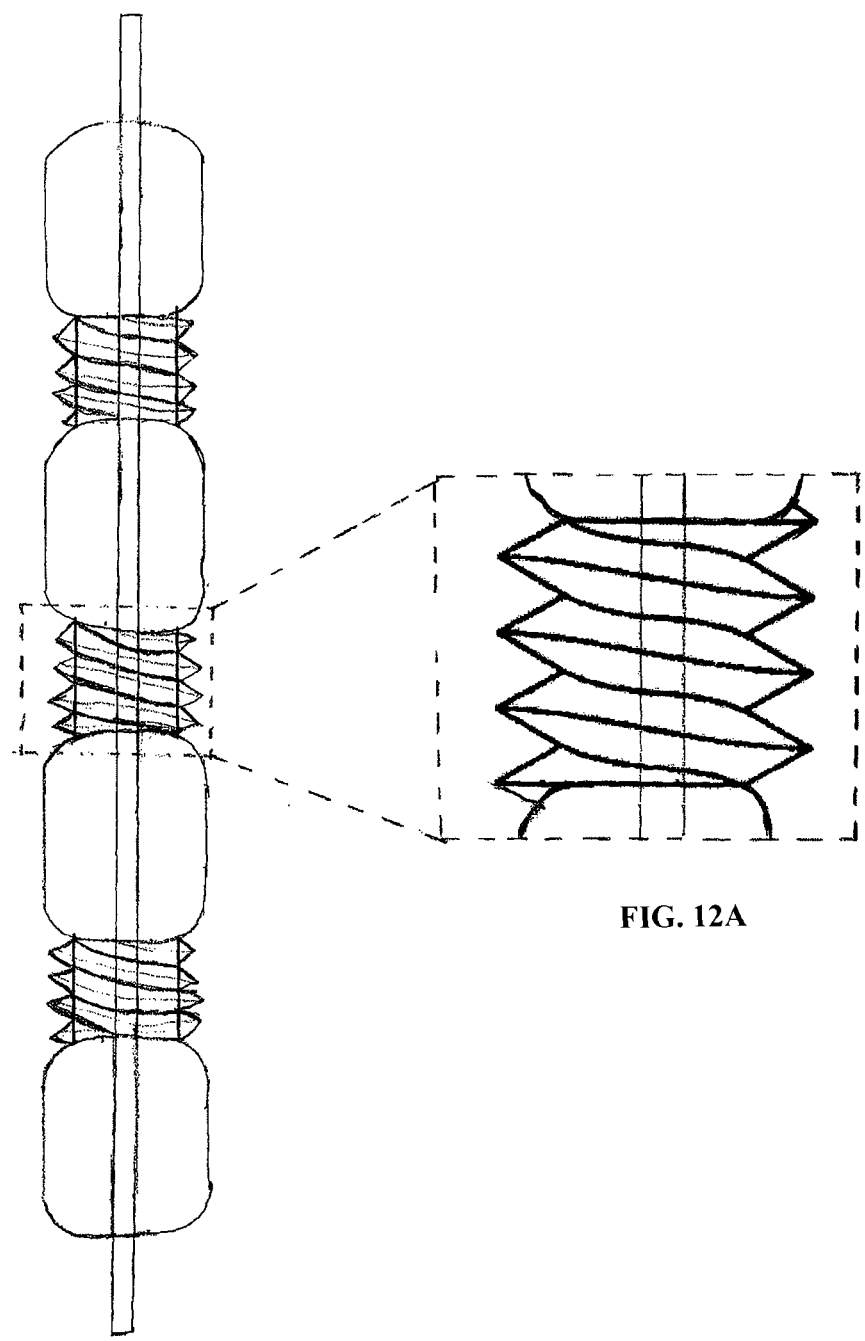
FIG. 12 illustrates buoyancy aid arrangements connected to a flexible pipe.
FIG. 12A is an enlarged view of a section of FIG. 12.

FIG. 12 shows an example of the invention similar to FIG. 11. However, the strakes have a cross section that is generally triangular. Also, the pitch of the strake winding is relatively smaller than that described above with respect to FIG. 11, with a lower portion of a winding contacting an upper portion of an adjacent winding. Therefore the strake covers the full surface of the body portion.

In each of the above examples, the strake is provided to reduce or interrupt vortex induced vibrations in water surrounding the flexible pipe in use. Because pipes in the sea tend to cause vortices to be created on the downstream side of the pipe, the protrusions are provided so as to break up or reduce those vortices. In this way, the vortices are much less likely to match the natural harmonic resonant frequencies of the flexible pipe, and so VIVs may be prevented or reduced.

It will be appreciated that the various dimensions and other parameters of the connector, and also the riser configuration may be optimized according to the environment and particulars of use, metocean data, and the relative dimensions of the remainder of the riser (the pipe length, width, weight, the dimensions of the buoyancy aids, etc.). Appropriate connector parameters may be determined by software simulation or computational fluid dynamics (CFD) software (e.g. Shear7 or VIVA), scaled model testing, or by trial and error testing. For example, firstly a stepped riser configuration may be designed (including riser length, buoyancy aid dimensions, location and the net buoyancy of the buoyancy aids). The configuration is then subjected to extreme strength and interference analysis with respect to metocean data. Then, VIV response of the system is analysed (mode number, VIV motion amplitude, etc.). Then various sized connectors may be tested in the analysis to find a solution in which VIV vibrations are suppressed.

The length of buoyancy elements and the space between buoyancy elements may be optimized so as to reduce VIVs. This may include optimizing the ratio of these dimensions.

Figure 15:
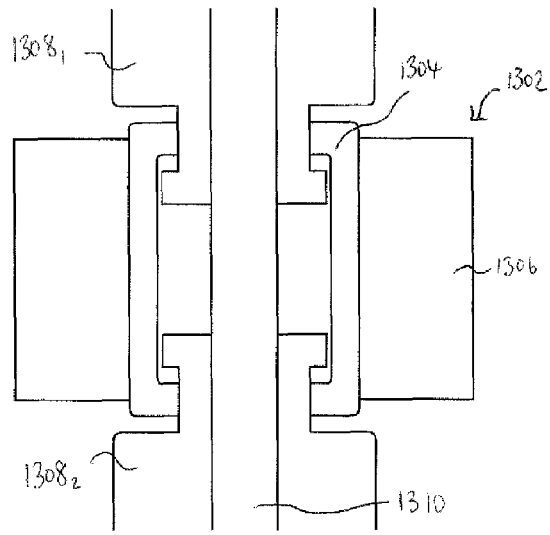
FIG. 15 illustrates a cross sectional view of the connector of FIG. 13.

FIGS. 13, 14 and 15 show another embodiment of the invention. Connectors 1302 are provided having a body portion 1304 and fin elements 1306 connected to and extending from the body portion. The fins portions are another type of protrusion that act to reduce or interrupt vortex induced vibrations in water surrounding the flexible pipe in use.

As shown in the cross sectional view of FIG. 15, the body portion 1304 is shaped so as to lie over a corresponding neck portion of adjacent buoyancy aids $1308_1, 1308_2$. The neck portion and body portion interlock to an extent, with a degree of movement of the body portion allowable along the longitudinal axis of the flexible pipe 1310. Radially inner surfaces of the body portion lie against a radially outer surface of the neck portion. The body portion is rotatable with respect to the neck portion of the buoyancy aids. The body portion 1304 and connector 1302 is thus freely rotatable around the flexible pipe 1310 about an axis A (FIG. 14).

As shown in the plan view of FIG. 13, a connector 1302 has four fin elements 1306 that are essentially planar pieces that extend outwards from the body portion 1304 at approximately equal intervals. Here the fin elements extend to a distance larger than the outer surface of the adjacent buoyancy aids 1308.

Here the fin elements extend the length of the connector, so as to affect the flow of fluid along the length of the connector.

The fin elements 1306 are arranged so that at least one fin element will lie in the pathway of water flowing around the flexible pipe, and act as a vane. As the fin element is pushed by the water, the whole connector will rotate about the flexible pipe 1310 (as indicated by the arrows in FIGS. 13 and 14). The fins portions will disrupt the fluid flow of water in that region.

In this example the connectors are formed from stainless steel, and are 1 m in length, 0.8 m in diameter at the body portion, with each fin element being approximately rectangular (length 1 m, width 0.75 m, depth 0.1 m).

The arrangement of FIG. 14 may be attached to a flexible pipe by either one or more buoyancy aids being clamped to the pipe, or an end connector or buoyancy aid being clamped to a midline connector, for example.

Figure 17:
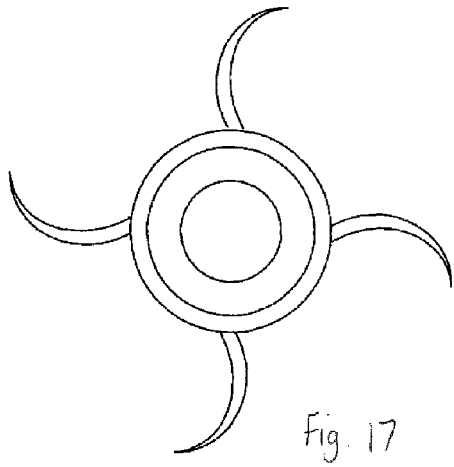
FIGS. 16 to 18 illustrate further plan views of different connectors.
Figure 16:
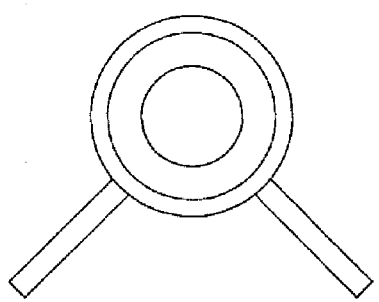
Figure 18:
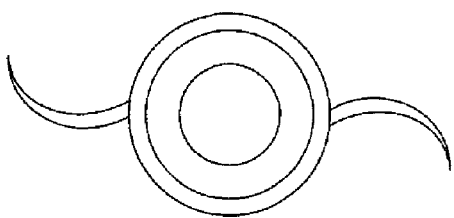

FIGS. 16, 17 and 18 show alternative arrangements of connectors with different numbers of fin elements and different fin element dimensions. FIG. 16 shows a connector similar to that shown in FIG. 13, but with two fin elements. FIGS. 17 and 18 show connectors that are similar to those in FIGS. 13 and 16 but with non-planar curved cross sections in plan view. All of the connectors shown are examples of connectors with fin elements arranged to catch fluid flow in the region of the flexible pipe and affect the fluid flow therearound.

Again, the connectors having fin elements as protrusions are provided to reduce or interrupt vortex induced vibrations in water surrounding the flexible pipe in use. The protrusions are provided so as to break up or reduce vortices created around the pipe. In this way, the vortices are much less likely to match the natural harmonic resonant frequencies of the flexible pipe, and so VIVs may be prevented or reduced.

In any of the above embodiments the connector may be used to control the longitudinal displacement between the buoyancy elements, helping to affect the fluid flow and reduce VIVs in a flexible pipe.

A skilled person will realize that fluid flowing around a pipe will have a portion of fluid adjacent the pipe wall that is subject to shear forces, thus causing a more turbulent flow (vorticity) with fluid flowing at different velocities. Another portion of fluid, generally further away from the pipe, will be relatively unaffected by forces from the pipe wall. The boundary between the area that is affected by shear forces and the area that is unaffected by shear forces is termed the boundary layer.

The protrusions are arranged to break up the boundary layer of fluid flowing past a flexible pipe. The protrusions act to effectively dissipate the vortex structures, without causing large turbulence themselves.

Various modifications to the detailed designs as described above are possible. For example, although the connector 822 described above is connected to a buoyancy aid during manufacture, the connector may alternatively be integrally formed with a buoyancy aid, for example being formed from the same material as a part of the buoyancy aid body.

Whilst the above-described buoyancy compensating elements include syntactic foam, the buoyancy providing material could instead be air, gas, or other material, or a combination of materials, to give suitable positive buoyancy. Alternatively the material could be a suitable ballast weight, e.g. sand, grit, or a metal or alloy, e.g. lead or steel in pellet form or other suitable shape. Other materials described are also for example only. It will be understood that whilst some of the buoyancy compensating elements described above are formed from one or two body portions, they could be formed from three or more body portions.

As described above, two or more buoyancy compensating elements can be joined together by respective connector portions, to form an in-line configuration of buoyancy compensating elements. Whilst four buoyancy compensating elements have been shown in the drawings, any number of buoyancy compensating elements can be used.

Whilst some examples of the present invention have been described with a connector at each end of the body portion, it will be realized that a buoyancy compensating element may have only one connector that is configured to mate with a corresponding portion of a body of an adjacent buoyancy compensating element.

Although the strake described above is a single helically wound strake continuously extending around the body portion of the connector, the strake may be intermittent, for example a plurality of protrusions (of any length) that do not connect but form the general shape of a helix.

The pitch of the helix winding of the strake may be varied to suit the particular use.

Although the strake described above has a generally rounded cross section, the cross section of the protrusion may take various forms, e.g. square or rectangular or triangular, another polygonal shape, a convex protrusion (any outwardly projecting shape), a trapezium, semi-circular or a non-uniform shape.

The connectors described above with fin elements may have any number of fin elements, e.g. 1 or 3 or 5 or 6 or more. The connectors and fin elements may have different dimensions, different shapes and different arrangements. For example, the fin element(s) may have a twisted surface so as to catch water flow in more than one dimension. For example, the connector may have a length between around 0.1 m and 3 m.

The fin members may not extend along the full length of the connector, but only a portion of the length of the connector.

The connectors may be directly connected to a flexible pipe, or may be not directly connected to a flexible pipe. In the latter case, the connector may be connectable to an adjacent buoyancy element. The connector may be freely rotatable around a flexible pipe or partially rotatable around a flexible pipe, or not rotatable at all.

Rather than strakes or fin members as protrusions for interrupting vortices around a flexible pipe, the protrusions may be other features, e.g. a splitter plate, trailing ribbon, hair fairing, or a pattern of shapes to perform the same function.

Aptly the length of the connector(s) is approximately ¼ or ½ or the same length as the length of each buoyancy element.

With the above-described arrangement it has been found that the provision of the protrusion(s) on the outer surface of a connector is effective to reduce shear layer oscillations and voracity of fluid flowing around pipe body compared to known designs. As such, the overall velocity and pressure oscillations are reduced in amplitude and severity leading to improved fluid flow and lower risk of high frequency vibrations causing a risk of fatigue failure of pipe components or equipment in the locality compared to the known design.

Embodiments of the invention described above should therefore help in the prevention of unwanted riser singing, which will in turn improve fatigue life and increase the lifetime of a flexible pipe.

The buoyancy compensating elements and associated connectors will be cost effective in terms of onshore fabrication and offshore installation.

Embodiments of the invention have a particular use for riser configurations where a generally vertical section of flexible pipe lays underwater, such as deep water or ultra deep water applications. Embodiments of the invention may enable a reduction in movement of the flexible pipe with currents and/or waves, and allow the overall position of the pipe to be controlled with respect to the top hang off point (e.g. the point where the pipe hangs from a vessel) and the seabed. Embodiments of the invention may also prevent overbending of a flexible pipe.

Embodiments of the invention will be particularly useful in reducing riser tension and lead to further benefits in terms of the requirements for a tensile armour layer.

With a connector or buoyancy arrangement including a connector that is split into two or more body portions, the connector can be easily retrofitted to a flexible pipe at the time of installation, just prior to a flexible pipe being lowered into the sea for example.

Buoyancy arrangements could be applied for use at 1000 or 2000 or even 3000 meters water depth for example. The net buoyancy of each buoyancy arrangement may be 10 tonnes (10,000 kg) for example. When using an in-line configuration of buoyancy arrangements, the net buoyancy may be 100 tonnes for example.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An assembly comprising:
   a connector assembly for connection between buoyancy compensating elements on a flexible pipe, comprising:
   a body portion for locating over a flexible pipe, the body portion connected to or formed integrally with one or more buoyancy compensating element at an end of the buoyancy compensating element, and
   one or more protrusion extending from the body portion and arranged to reduce or interrupt vortex induced vibrations in water surrounding the flexible pipe in use,
   wherein the one or more buoyancy compensating element is connected in series with the connector assembly, and
   wherein the connector assembly is configured to connect to a further connector assembly or a further buoyancy compensating element to connect two or more buoyancy compensating elements in series in an in-line configuration.

2. An assembly as claimed in claim 1, wherein the connector assembly has a length predetermined to reduce or interrupt vortex induced vibrations.

3. An assembly as claimed in claim 1, the body portion of the connector assembly further comprising an engaging element configured to be connectable with a buoyancy compensating element.

4. An assembly as claimed in claim 1 wherein the one or more protrusion comprises one or more strake helically protruding from the body portion.

5. An assembly as claimed in claim 4 wherein the one or more strake is continuous or intermittent.

6. An assembly as claimed in claim 1 wherein the body portion of the connector assembly is generally cylindrical and wherein the one or more protrusions comprises a fin member protruding outwards from the body portion and in a direction extending along the longitudinal axis of the cylinder.

7. An assembly as claimed in claim 1 wherein the one or more protrusions comprises a splitter plate, trailing ribbon, hair fairing, or a pattern of shapes comprising a polygon, stripe, zigzag, square, diamond, rectangle, triangle, circle, oval or any combination thereof, or a protrusion created by indented cavities of these pattern of shapes.

8. An assembly as claimed in claim 1 wherein the connector assembly is configured to be directly connected to a flexible pipe.

9. An assembly as claimed in claim 1 wherein the connector assembly is configured to be connectable to an adjacent buoyancy compensation element and is rotatable at least partly around a flexible pipe.

10. An assembly as claimed in claim 1 wherein the connector assembly has a length of between around 0.1 m and 3 m.

11. An assembly as claimed in claim 1 wherein the protrusion extends at least 2 cm from the body portion.

12. An assembly as claimed in claim 1 wherein the protrusion extends radially from the body portion.

13. A riser assembly comprising a flexible pipe, an assembly as claimed in claim 1 wherein the one or more buoyancy compensating element is connected to or integral with the connector assembly.

14. A riser assembly as claimed in claim 13 further comprising a further buoyancy compensating element connected to or integral with the connector assembly.

15. A riser assembly as claimed in claim 13 wherein the connector assembly and the or each buoyancy compensating element each have a length predetermined with respect to each other to reduce or interrupt vortex induced vibrations.

16. A riser assembly as claimed in claim 13 wherein the or each buoyancy compensating element is configured to be clamped to the flexible pipe.

17. A method of manufacturing an assembly comprising a connector assembly for connection between buoyancy compensating elements on a flexible pipe, comprising:
provided a body portion for locating over a flexible pipe, the body portion connected to or formed integrally with one or more buoyancy compensating element at and end of the buoyancy compensating element, and
forming one or more protrusion extending from the body portion, the one or more protrusion arranged to reduce or interrupt vortex induced vibrations in water surrounding the flexible pipe in use,
connecting the one or more buoyancy compensating elements in series with the connector assembly,
wherein the connector assembly is configured to connect to a further connector assembly or a further buoyancy compensating element to connect two or more buoyancy compensating elements in series in an in-line configuration.

* * * * *